United States Patent
Chen et al.

(10) Patent No.: US 8,401,178 B2
(45) Date of Patent: Mar. 19, 2013

(54) MULTIPLE MICROPHONE SWITCHING AND CONFIGURATION

(75) Inventors: Shaohai Chen, Cupertino, CA (US); Xingqun Li, San Jose, CA (US)

(73) Assignee: Apple Inc., Cupertino, CA (US)

(*) Notice: Subject to any disclaimer, the term of this patent is extended or adjusted under 35 U.S.C. 154(b) by 755 days.

(21) Appl. No.: 12/242,517

(22) Filed: Sep. 30, 2008

(65) Prior Publication Data

US 2010/0081487 A1 Apr. 1, 2010

(51) Int. Cl.
*H04M 9/08* (2006.01)
(52) U.S. Cl. ............................. 379/406.03; 379/406.02
(58) Field of Classification Search .................... 381/92; 379/406.03, 406.02
See application file for complete search history.

(56) References Cited

U.S. PATENT DOCUMENTS

| | | | |
|---|---|---|---|
| 6,639,987 B2 | 10/2003 | McIntosh | |
| 7,054,450 B2 | 5/2006 | McIntosh et al. | |
| 7,106,865 B2 | 9/2006 | Pavlov et al. | |
| 7,162,043 B2 | 1/2007 | Sugiyama et al. | |
| 7,280,958 B2 | 10/2007 | Pavlov et al. | |
| 7,684,571 B2 | 3/2010 | Grosvenor et al. | |
| 2005/0069149 A1 | 3/2005 | Takahashi et al. | |
| 2007/0036348 A1* | 2/2007 | Orr ................................. | 379/424 |
| 2008/0101625 A1 | 5/2008 | Fazzio et al. | |
| 2009/0190769 A1* | 7/2009 | Wang et al. .................... | 381/66 |
| 2009/0196429 A1* | 8/2009 | Ramakrishnan et al. ....... | 381/26 |

FOREIGN PATENT DOCUMENTS

| | | |
|---|---|---|
| GB | 2327012 | 6/1999 |
| JP | 61227458 | 10/1986 |
| WO | WO 2006027707 | 3/2006 |

OTHER PUBLICATIONS

Cao, Yuchang, et al., "An Auto Tracking Auto Beamforming Microphone Array for Sound Recording", Speech Research Lab, Signal Processing Research Centre, Queensland University of Technology, Brisbane, QLD, Presented at 5th Australian Regional Convention, Apr. 26-28, 1995, Sydney, an Audio Engineering Society preprint.
PCT International Search Report completed Nov. 24, 2009, mailed Dec. 23, 2009, Intl. Application No. PCT/US2009/057212, Intl. Filing Date Sep. 16, 2009, Applicant: Apple, Inc., 17 pgs.
Liu, Zicheng, et al., "Energy-Based Sound Source Localization and Gain Normalization for Ad Hoc Microphone Arrays", Acoustics, Speech and Signal Processing, 2007, ICASSP 2007, IEEE International Conference on Apr. 15-20, 2007, Honolulu, HI, ISSN: 1520-6149, (pp. II-761-II-764), [4 pages].

* cited by examiner

*Primary Examiner* — Alexander Jamal
(74) *Attorney, Agent, or Firm* — Blakely, Sokoloff, Taylor & Zafman LLP

(57) ABSTRACT

A mobile communications device contains at least two microphones. One microphone is designated by a selector to provide a voice dominant signal and another microphone is designated to provide a noise or echo dominant signal, for a call or a recording. The selector communicates the designations to a switch that routes the selected microphone signals to the inputs of a processor for voice signal enhancement. The selected voice dominant signal is then enhanced by suppressing ambient noise or canceling echo therein, based on the selected noise or echo dominant signal. The designation of microphones may change at any instant during the call or recording depending on various factors, e.g. based on the quality of the microphone signals. Other embodiments are also described.

20 Claims, 4 Drawing Sheets

MULTIPLE MICROPHONE SWITCHING AND CONFIGURATION

FIELD

An embodiment of the invention is generally related to mobile devices that have multiple microphones for enhancing an audio signal.

BACKGROUND

Portable handheld electronic devices that have a telephony function, such as the iPhone™ multifunction mobile device by Apple Inc., have a built-in or integrated microphone located at a bottom end portion of the device which is near the user's mouth when the device is being used as a telephone handset by its user. This microphone captures a voice signal of a near end user which is then transmitted to the other party or parties of a call. The microphone may also be used to record audio signals for other device features, such as for sound recordings and videoconferences. However, if ambient noise in the environment or physical blockage of the microphone interferes with the voice signal of the near end user, then the other party of the call may not hear the voice signal as clearly as he would desire.

SUMMARY

In one embodiment of the invention, a mobile device includes multiple microphones (e.g., a microphone array) that work to transmit a voice signal of a near end user to the other party or parties of a call. The device has a switching and/or configuration process running in an audio signal processor, that is monitoring the signals being picked up by the microphones. Upon comparing the signals from the various microphones with each other, the process may designate one microphone to provide a voice dominant signal and another microphone may be designated to provide a noise suppression and/or echo cancellation dominant input signal. The voice dominant signal is then enhanced by an uplink voice signal processor of the device, suppressing ambient noise and echo based on the noise suppression and/or echo cancellation dominant signal.

The selection of one microphone to provide the voice dominant signal and another microphone to provide the noise suppression and/or echo cancellation dominant signal may be based on one or more factors, determined, for example, by an audio signal processor, accelerometer, or user input. For example, based on the comparison of audio signals from each of the microphones, the microphone that picks up the "best" voice signal representing a particular near end user (where there may be more than one such user such as during a conference call) may be selected to provide the voice dominant signal. In another example, physical blocking of a particular microphone of the device, such as by a person's hand, may cause the audio signal processor to automatically detect such a situation and then switch to another microphone to provide the voice dominant signal (because the voice signal may be more clear as picked up by one of the other microphones of the device). In a further example, microphone selection can be commanded by manual user input that designates which microphone is to provide the voice dominant signal. It is noted that such microphone selection or switching may occur dynamically, i.e. during a call, or in the midst of a running audio application (e.g., during a voice recording), such as when the near end user shifts the device in her hand causing a microphone to be blocked, or when a near end talker moves from one side of the device to another.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

In this section, several preferred embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
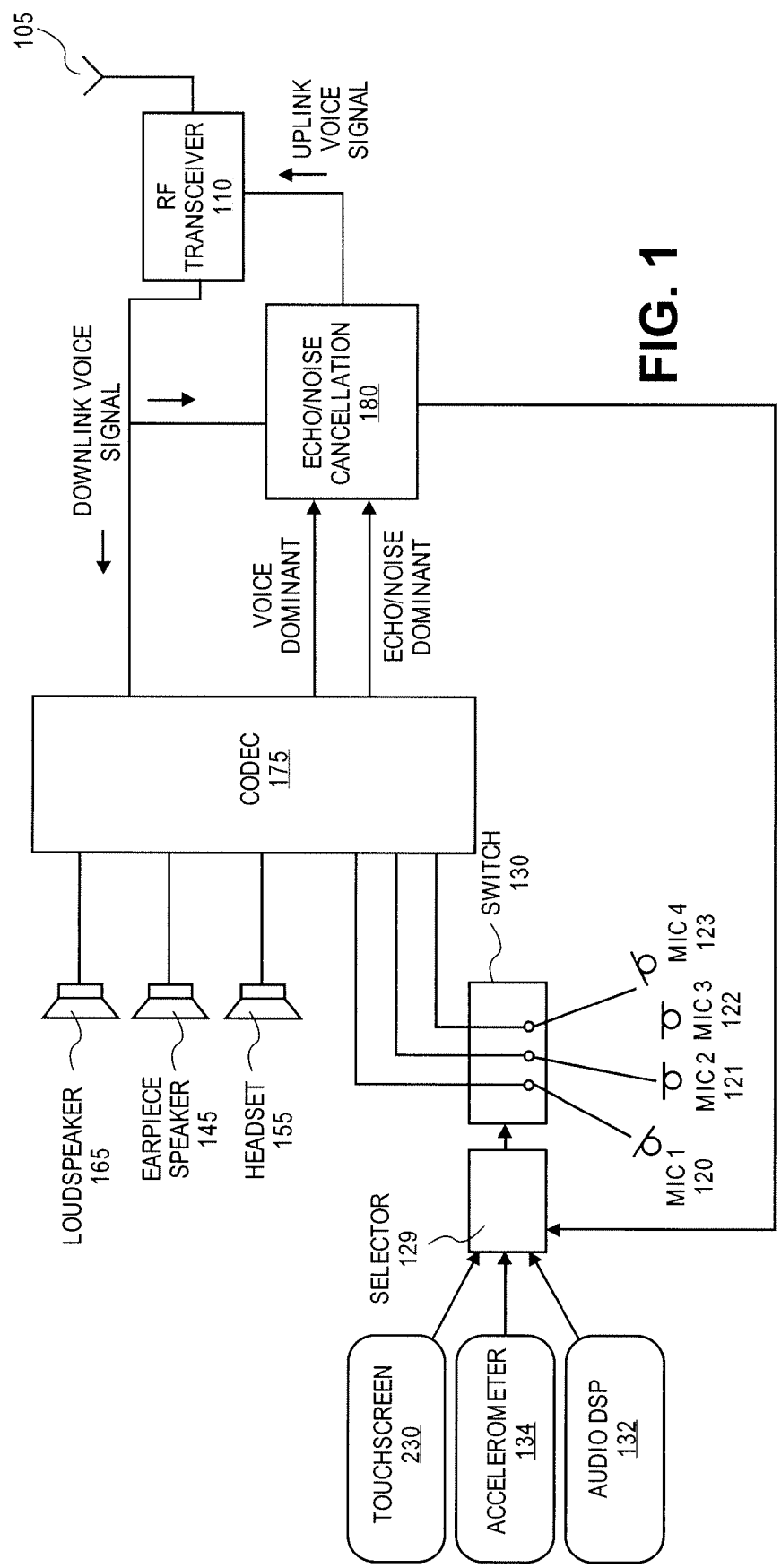
FIG. 1 is a block diagram of an example embodiment of a portable handheld device with multiple microphones for enhancing a voice dominant signal.

FIG. 1 is a block diagram of an example embodiment of a portable handheld device with multiple microphones for enhancing a voice dominant signal. The device may be an iPhone™ device by Apple Inc. of Cupertino, Calif. Alternatively, it could be another portable handheld multi-function mobile electronic device or smart phone that has audio recording and/or voice telephony capacities. The device may have a fixed, single piece housing like the iPhone™ device, or it may have a movable, multi-piece housing such as a clamshell design or sliding keypad. The device may also have a display screen which can be used to display typical smart phone features such as visual voicemail, web browsing, email, digital camera photos, and others.

The device includes an antenna 105 that receives and transmits signals in conjunction with a radio frequency transceiver 110 for a wireless call between a near end user of the device and another party, the far end user. Two main channels may be implemented for the processing of audio signals associated with a call, namely an uplink channel processor and a downlink channel processor, both of which may be implemented in part by a coder/decoder integrated circuit device, CODEC 175. The downlink channel processor may be responsible for demodulating and enhancing the audio signals received from the far end user over a wireless communications network 100. For example, when the far end user speaks, his voice signal is received from the network 100 by the RF transceiver 110 and antenna 105, and then demodulated and processed by the downlink channel processor for listening by the near end user of the device through any one of several ways. During a call, the device may operate in one of at least three modes: handset mode, speaker mode, and headset mode (including both wired and wireless, e.g. Bluetooth, headset implementations). A switch 170 thus routes the downlink audio signal to a loudspeaker 165, earpiece speaker 145, or a headset 155 (a wired or wireless headset) based on the mode of the call.

The uplink channel processor supports the transmission of audio signals originating from the near end user of the device acquired by one or more of microphones 120, 121, 122, 123 and sent to the far end user over a wireless communications network. In other words, when the near end user speaks, his voice signal is processed by the uplink channel processor for enhancing quality and then modulated onto a carrier signal for transmission by the antenna 105 to the other party.

In the example shown in FIG. 1, the device has four microphones, all of which may be integrated in a device housing (together with most of the other components depicted). In general, however, the concepts here are applicable to devices that have two or more microphones. An audio digital signal processor 132 monitors (to compare or analyze) the available microphone signals and provides the results of its analysis to a selector 129. The latter on that basis configures a switch 130 to in effect select one of the four microphones 120, 121, 122, 123 to act as the "primary" microphone, to provide a voice dominant signal (based on the audio signal picked up by each of the four microphones 120, 121, 122, 123). The switch 130 may route the selected microphone signals to a voice dominant signal input of the CODEC 175 and a noise and/or echo dominant signal input of a controller 180. The selector 129 makes the decision to select one or more of the remaining microphones to act as the "secondary" microphone(s) (or "tertiary," etc.) to also provide a noise suppression and/or echo cancellation dominant signal, which is used to enhance the voice dominant signal of the primary microphone through noise suppression and/or echo cancellation. Using separate microphones to provide the voice dominant signal and to provide the noise/echo cancellation dominant signal may be superior to using a single microphone to derive both signals, because the separate microphones, by virtue of being located at different places in the device housing, may provide a better representation of the sound waves that are incident on the device housing. A combination of the factors described below may assist the selector 129 in determining which microphones to select for providing and enhancing the voice dominant signal.

Figure 2:
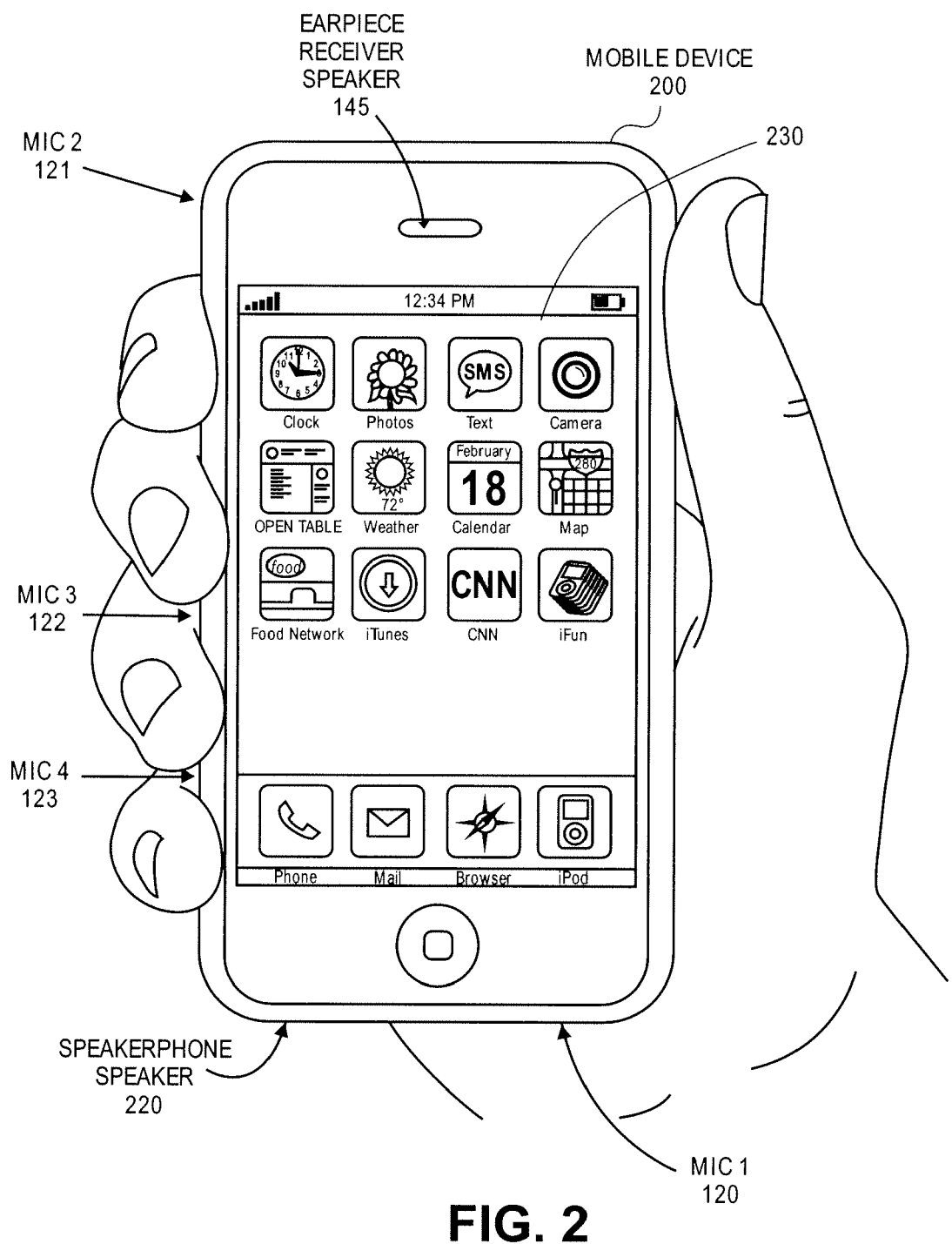
FIG. 2 shows a portable handheld device having multiple microphones for enhancing a voice dominant signal.

To continue with an example, one scenario that would influence the quality of a microphone signal is when a user inadvertently blocks the associated microphone with his hand, e.g. see FIG. 2, where mic 2 and mic 3 are physically blocked. In this case, an analysis of the signals from these physically blocked microphones may indicate that they are not ideal selections for providing a voice dominant signal. However, it should be noted that the microphone that picks up the highest powered or loudest signal is not necessarily the appropriate choice for providing the voice dominant signal. Various factors involving signal-to-noise ratio, total harmonic distortion, crosstalk, and side tone may be taken into consideration when evaluating which microphone's signal should be used as the voice dominant signal.

Another instance of automatic microphone switching may occur when changing from handset mode to speakerphone mode, and vice-versa. Thus, in addition to the analysis and comparison of the microphone signals between each other, the decision to select a different microphone during a call may also be influenced by the mere fact of a change between handset and speakerphone modes.

In another embodiment, a touchscreen 230, see FIG. 2 (or other mechanism for receiving manual input from the near end user), may influence which microphones are selected by the switch 130 to provide the voice dominant signal and echo/noise dominant signal. A user of the device may actuate a virtual button on the touchscreen (or a physical button on the device) to provide a direct indication of which microphone the user would like to use to pick up the voice dominant signal. For example, if the user is holding the device up to video record a subject in a recorded interview session, the user may press a predetermined button that is associated with mic 2 (se FIG. 2) which may be the one that is most directly facing the interviewee. The near end user may then switch to another microphone that is facing himself (the interviewer) when he is speaking.

In yet another embodiment, the device implements audio tracking or audio beam forming capability using its microphones, to identify the particular "theta" (angle) at which a target speaker is located, by measuring for the maximum audio signal picked up for the target speaker. Thus, as a target speaker is moving around while talking, the tracking/beam forming capability may actively track the strongest signal by switching amongst multiple microphones situated in a microphone array so as to always select the "best" of the available microphone signals as the voice dominant signal.

In a multi-party audio session such as a conference call or a group recording, multiple microphones and multiple cameras can be used to visually and audibly record or send an uplink voice call signal of two near end speakers to a third (far end) party. Here, both near end users may be speaking at the same time, which may require double the microphone selection aspects (e.g., two microphones may be selected to pick up voice dominant signals of two users) and the audio signals may be either mixed in a full duplex manner or separated in a half-duplex mode where the signals take turns.

In a further embodiment, an accelerometer 134 may influence which microphones are selected to provide the voice dominant signal and which are used to enhance the voice dominant signal. For example, movement or re-positioning of the device can be detected using the accelerometer 134, to indicate that certain microphones positioned at certain parts of the device are more appropriate to use in a particular situation.

Although the switch 130 is symbolized by a rotary-type switch symbol, its practical implementation may be entirely digital. In other words, the switch 130 may provide the microphone signals as digital streams, through several digital outputs. The switch may be a software and hardware implementation that performs "software" routing by, for example, providing different pointers to the different microphone streams that are retrieved from memory. The digital outputs may be mapped to several digital inputs of the uplink voice processor as shown in FIG. 1 that selects multiple microphones based on the above factors and/or commands. For example, these selected signals may be input to the CODEC 175, which refers to a coder-decoder that processes (e.g., decodes or decompresses) an input, coded, voice dominant stream. An echo/noise cancellation controller 180 refines the voice dominant signal received from the CODEC 175 by suppressing noise and canceling echo with the assistance of one or more signals from the other selected microphones. The echo/noise cancellation controller 180 may also operate on a downlink voice signal. Accordingly, the echo/noise cancellation controller 180 may be relevant to both near end echo and the far end echo. Near end echo refers to the far end user hearing his own echo because the near end user is operating the device in speaker mode. Far end echo refers to echo from the network or line echo. The output of the echo/noise cancellation controller 180 provides an enhanced voice signal that is sent to the radio frequency transceiver 110. The controller 180 also has an output that provides control information or feedback to the selector 129 regarding the enhancement of the voice dominant signal.

Turning now to FIG. 2, this figure depicts an example embodiment of a portable handheld device 200 having multiple microphones 120, 121, 122, 123 for enhancing a voice dominant signal of a near end user. In this illustration, the near end user is holding the device 200 in her hand.

The device 200 includes various capabilities to enable the user to access features involving, for example, calls, text messages, voicemail, e-mail, the Internet, scheduling, photos, and music as shown on the display screen 230. This figure depicts a first microphone 120 located away from the earpiece receiver speaker 145 so that the voice signal of the near end user may be more easily received when holding the device 200 to the user's ear. Three additional microphones 121, 122, 123 are located at the side of the device 200, but it should be recognized that there may be a greater or fewer number of microphones located anywhere on the device 200.

For applications that involve a microphone, such as a telephone call, audio recording, or videoconference, each of the four microphones 120, 121, 122, 123 may pick up a near end audio signal. One microphone may be selected as the primary microphone to provide a voice dominant signal and another microphone may be selected as the secondary microphone to provide a noise suppression and/or echo cancellation dominant signal. This selection may change dynamically or switch during a call or audio recording, depending on one or more factors, including a comparison of the signals from these four microphones 120, 121, 122, 123 made by the audio digital signal processor 132 (see FIG. 1), a current call handling mode of the device 200 (e.g., handset mode or speakerphone mode), and user input received via the touch screen 230. In one example, based on the comparison of audio signals from each of the microphones, the microphone that picks up the most optimal voice signal may be selected to provide that signal. In another example, a physical blocking of a particular microphone of the device, such as by a person's hand, may cause the device not to select that microphone to provide the voice dominant signal because the voice signal may be clearer as read by one of the other microphones of the device. In addition, microphone selection can be commanded by user input that designates which microphone provides the voice dominant signal. Furthermore, microphones can be selected based on a mode of the device, e.g., to select the first microphone 120 as the primary microphone or voice dominant signal provider when in handset mode and one of the other microphones 121, 122, 123 as the primary microphone or voice dominant signal provider when in speakerphone mode. In the case that more than two microphones are provided on a device, the remaining microphones may either be ignored or turned off with respect to enhancing the voice dominant signal or they may be used to further assist in enhancing the voice dominant signal.

It is noted that such microphone selection may dynamically change during the call or in the midst of a running application (e.g., during a voice recording). For instance, if a near end user is speaking on the phone and shifts his hand over the phone to hold it in a different position, he may inadvertently block the microphone selected as the primary microphone that provides the voice dominant signal with his hand. In this situation, the device may sense that this microphone no longer provides the most optimal voice dominant signal as compared to another microphone and therefore dynamically switches its selection to the other microphone, as the primary microphone to provide the voice dominant signal during the call.

Figure 3:
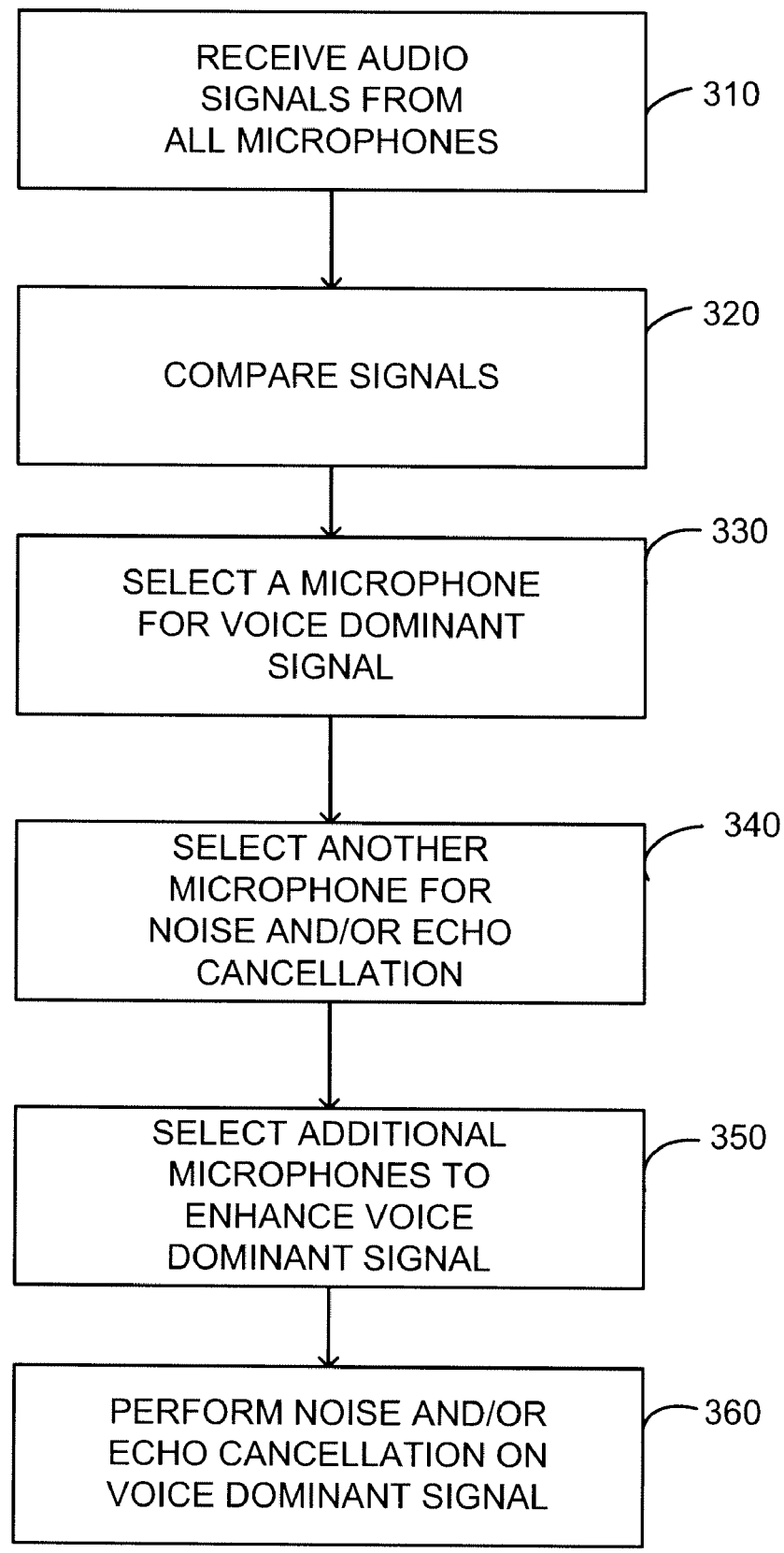
FIG. 3 is a flow diagram of a portable handheld device with microphone switching capabilities.

Proceeding to the next figure, FIG. 3 is a flow diagram of a portable handheld device with microphone switching capabilities. The device uses multiple microphones to enhance a voice dominant signal by suppressing ambient noise and/or echo.

In this example embodiment, the device initially receives audio signals from all microphones of the device (operation 310). The device has at least two microphones located at various locations on the device. Each of the signals is then compared with each other to determine which microphone provides the most optimal voice dominant signal (operation 320). One of the microphones is then selected as the primary microphone to provide the voice dominant signal (operation 330). In the case of two microphones on the device, the remaining microphone is, by default, the secondary microphone to provide the noise suppression and/or echo cancellation dominant signal (operation 340). If there are more than two microphones on the device, then one or more of the other remaining microphones may be selected as the secondary, tertiary, etc. microphone to assist with ambient noise and echo cancellation to enhance the voice dominant signal (operation 350). This selection may be informed by feedback from the noise/echo cancellation controller 180 (see FIG. 1), through, for example, a trial and error procedure that applies signals from the remaining microphones to enhance the voice dominant signal and evaluates them to select the one that is likely to result in the "best" enhancement to the voice dominant signal. The voice dominant signal of the primary microphone is then enhanced by performing noise suppression and/or echo cancellation with the assistance of the selected one or more of the other microphones (operation 360).

It is noted that other embodiments of selecting a microphone for the voice dominant signal exist. For example, in the case of user input switching, the device need not receive and compare audio signals of all microphones before selecting a microphone as the primary microphone. Rather, microphone selection would occur according to user command from a physical button, a virtual button on a touch screen, etc.

Figure 4:
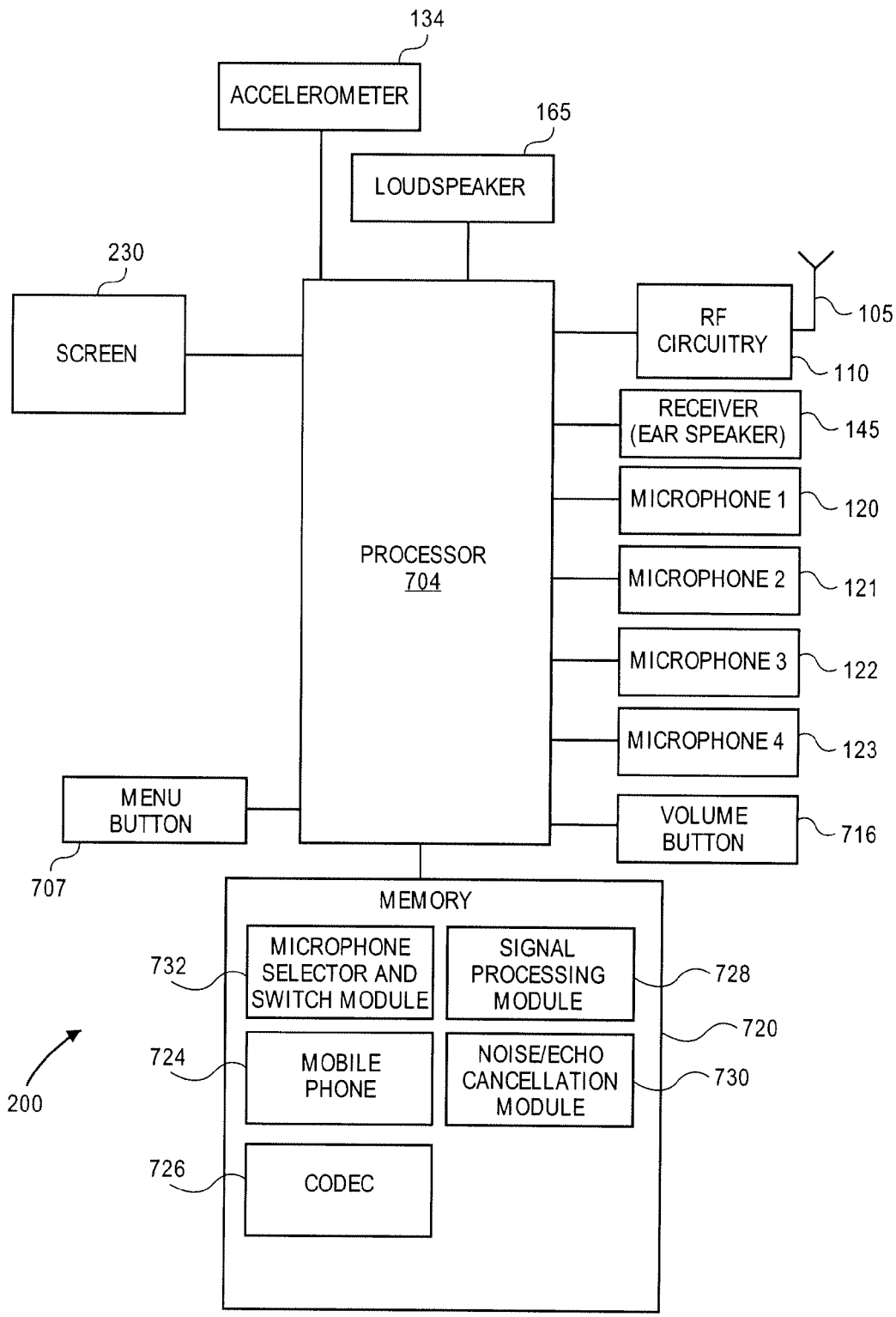
FIG. 4 depicts a block diagram of an example, portable handheld multifunction device in which an embodiment of the invention may be implemented.

FIG. 4 depicts a block diagram of an example, portable handheld multifunction device 200 in which an embodiment of the invention may be implemented. The device 200 has a processor 704 that executes instructions to carry out operations associated with the device 200. The instructions may be retrieved from memory 720 and, when executed, control the reception and manipulation of input and output data between various components of device 200. Although not shown, the memory 720 may store an operating system program that is executed by the processor 704, and one or more application programs are said to run on top of the operating system to perform different functions described below. The accelerometer 134 provides an indication of the position or movement of the device. The screen 230 displays a graphical user interface (GUI) that allows a user of the device 200 to interact with various application programs running in the device 200. The GUI displays icons or graphical images that represent application programs, files, and their associated commands on the screen 230. These may include windows, fields, dialog boxes, menus, buttons, cursors, scrollbars, etc. The user can select from these graphical images or objects to initiate the functions associated therewith.

In one embodiment, the screen 230 is a touch screen that also acts as an input device, to transfer data from the outside world into the device 200. This input is received via, for example, the user's finger touching the surface of the screen 230, but it may also be received via physical buttons on the device 200. When the screen is powered on, touch inputs may be received and when the screen is powered off, touch inputs may not be received.

Still referring to FIG. 4, the device 200 may operate in a mobile telephone mode. This is enabled by the following components of the device 200. An integrated antenna 105 that is driven and sensed by RF circuitry 110 is used to transmit and receive cellular network communication signals from a nearby base station, or wireless local area network signals from a wireless access point or router (e.g., to enable wireless voice over Internet Protocol, VOIP, calls) (not shown). A mobile phone application 724 executed by the processor 704 presents mobile telephony options on the screen 230 for the user, such as a virtual telephone keypad with call and end buttons. The mobile phone application 724 also controls at a high level the two-way conversation in a typical mobile telephone call, by directing a speech signal from one or more built-in microphones 120, 121, 122, 123 to the uplink voice signal processor which then feeds the RF circuitry, while at the same time directs a speech signal from the other side of the conversation to the downlink voice signal processor an then through the receiver or ear speaker 145 in handset mode, and the loudspeaker 165 in speaker mode. The mobile phone application 724 also responds to the user's selection of the receiver volume, by detecting actuation of the physical volume button 716. Although not shown, the processor 704 may include a cellular base band processor that is responsible for much of the downlink and uplink digital audio signal processing functions and cellular network protocol signaling associated with a cellular phone call, including encoding and decoding the voice signals of the participants to the conversation.

The device 200 may be placed in either handset mode or speaker mode for telephone calls, in response to, for example, the user actuating a physical menu button 707 and then selecting an appropriate icon on the display device of the screen 230. In either telephone mode, the mobile phone application 724 may control loudness of the downlink signal, based on a detected actuation or position of the physical volume button 716.

Some of the elements described in FIGS. 1 and 2 may be implemented as instructions stored in memory 720 that program the processor 704. The microphone switching control logic that is responsible for the decision that selects the microphones used for the voice dominant signal and for the noise suppression and/or echo cancellation dominant signal may be implemented in a microphone selector and switch module 732. The audio DSP 132, which compares the audio signals picked up by each of the microphones may be implemented in a signal processing module 728. A CODEC module 726 may perform the purely digital aspects of the downlink and uplink voice signal processing functions of the CODEC 175, and the noise/echo cancellation controller 180 may be implemented in a noise/echo cancellation module 730. Other combinations of hardware and software that can perform the functions of these elements in a mobile device are possible.

An embodiment of the invention may be a machine-readable medium having stored thereon instructions which program a processor to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROM), Read-Only Memory (ROM), Random Access Memory (RAM), and Erasable Programmable Read-Only Memory (EPROM).

In the foregoing specification, the invention has been described with reference to specific embodiments thereof. It will, however, be evident that various modifications and changes can be made thereto without departing from the broader spirit and scope of the invention as set forth in the appended claims. For example, the microphone switching capabilities described above, used to enhance a voice dominant signal by application of noise suppression and/or echo cancellation, may also be applied in applications such as audio or video recordings, rather than ongoing telephone calls. In that case, referring now to FIG. 4, a digital media player application module may be added that is stored in the memory 720 for enabling the user of the device 200 to manage the recording. The specification and drawings are, accordingly, to be regarded in an illustrative rather than a restrictive sense.

We claim:

1. An apparatus comprising:
    a communications device housing having integrated therein:
        an uplink channel processor to provide an uplink voice signal for a call by enhancing a voice dominant input signal using an echo or noise dominant input signal;
        a downlink channel processor to receive a downlink voice signal for the call;
        a plurality of microphones;
        a switch to couple (a) a microphone signal, that is selectable from each of the plurality of microphones, into a voice dominant input of the uplink channel processor, and (b) a further microphone signal, selectable from each of the plurality of microphones, into a noise and/or echo dominant input of the uplink channel processor; and
        a selector to dynamically control the switch during the call to change the coupling of the microphone signals wherein the selector is to change coupling of the voice dominant input and the noise and/or echo dominant input, based on a current call handling mode of the apparatus, the current call handling mode being one of handset mode and speakerphone mode.

2. The apparatus of claim 1, wherein the switch is to couple an additional microphone signal, selectable from each of the plurality of microphones, into a supplementary input of the uplink channel processor for enhancing the voice dominant input signal.

3. The apparatus of claim 1, wherein the selector is to change coupling of one of the voice dominant input or the noise and/or echo dominant input based on an analysis of microphone signals from the plurality of microphones.

4. The apparatus of claim 3, wherein the selector is to change said coupling of one of the voice dominant input or the noise and/or echo dominant input in response to one microhone signal having a reduced signal to noise ratio as compared to another one of the microphone signals.

5. The apparatus of claim 1, wherein the selector is to change coupling of one of the voice dominant input or the noise and/or echo dominant input based on a position of the apparatus detected by an accelerometer.

6. The apparatus of claim 1, wherein at least two microphones of the plurality of microphones are not positioned adjacent to each other.

7. A machine-implemented method comprising the following operations performed in a communications device during a recording session or a call:

analyzing signals from a plurality of microphones;

switching a first coupling of a microphone signal between the plurality of microphones and a voice dominant input based on the analysis of the signals from the plurality of microphones;

switching a second coupling of a further microphone signal between the plurality of microphones and a noise or echo dominant input based on the analysis of the signals from the plurality of microphones; and enhancing the microphone signal that is coupled to the voice dominant input, by suppressing ambient noise and/or canceling echo based on the microphone signal that is coupled to the noise or echo dominant input, wherein one of said switching a first coupling and a second coupling is based on a current call handling mode of operation of the communications device being one of handset mode and speakerphone mode.

8. The machine-implemented method of claim 7, wherein said switching a first coupling is in response to one microphone having a reduced signal-to-noise ratio as compared to another microphone in the plurality of microphones.

9. The machine-implemented method of claim 7, wherein said switching a second coupling is in response to one microphone having a reduced signal-to-noise ratio as compared to another microphone in the plurality of microphones.

10. A telephony device comprising:

a housing having a plurality of microphones;

a selector to dynamically select, during a sound recording or sound communication, one microphone of the plurality of microphones for a voice dominant input and another microphone of the plurality of microphones for a noise or echo dominant input;

a switch coupled to the selector and to the plurality of microphones, to route signals from the selected microphones to said voice dominant and noise or echo dominant inputs; and a processing component to enhance the signal at the voice dominant input based on the signal at the noise or echo dominant input wherein the plurality of microphones are more than two microphones and wherein the selector's dynamic control of the switch is informed through a trial and error procedure that (a) applies microphone signals, other than the one coupled to the voice dominant input by the switch, to enhance the microphone signal that is coupled to the voice dominant input and (b) evaluates the applied microphone signals to select one that is most likely to enhance the microphone signal that is coupled to the voice dominant input.

11. The telephony device of claim 10, wherein output signals of unselected ones of the plurality of microphones are ignored by the processing component while enhancing the voice dominant input signal.

12. The telephony device of claim 10, wherein the selector is to change a selection of the one microphone or the another microphone during the sound recording or sound communication.

13. The telephony device of claim 10, wherein the selection of the one microphone in handset mode differs from the selection of the one microphone in speakerphone mode.

14. The telephony device of claim 10, wherein the processing component is to use each of the plurality of microphones to actively track a voice of a person in the sound recording or sound communication.

15. The method of claim 7 wherein output signals of unselected ones of the plurality of microphones are ignored while enhancing the microphone signal that is coupled to the voice dominant input.

16. The method of claim 7 wherein the plurality of microphones are more than two microphones and wherein said switching a second coupling is informed through a trial and error procedure that (a) applies microphone signals, from the microphones other than the one associated with the first coupling, to enhance the microphone signal that is coupled to the voice dominant input and (b) evaluates the applied microphone signals to select one that is most likely to enhance the microphone signal that is coupled to the voice dominant input.

17. The telephony device of claim 10, wherein the selector is to select the one microphone and the another microphone based on information from an accelerometer.

18. The apparatus of claim 1 wherein the selector is to change the coupling of the voice dominant input in response to one microphone signal having reduced signal-to-noise ratio as compared to another.

19. The telephony device of claim 10, wherein the sound recording or sound communication is a video recording.

20. The telephony device of claim 10, wherein the sound recording or sound communication is a video conference call.

* * * * *